UNITED STATES PATENT OFFICE.

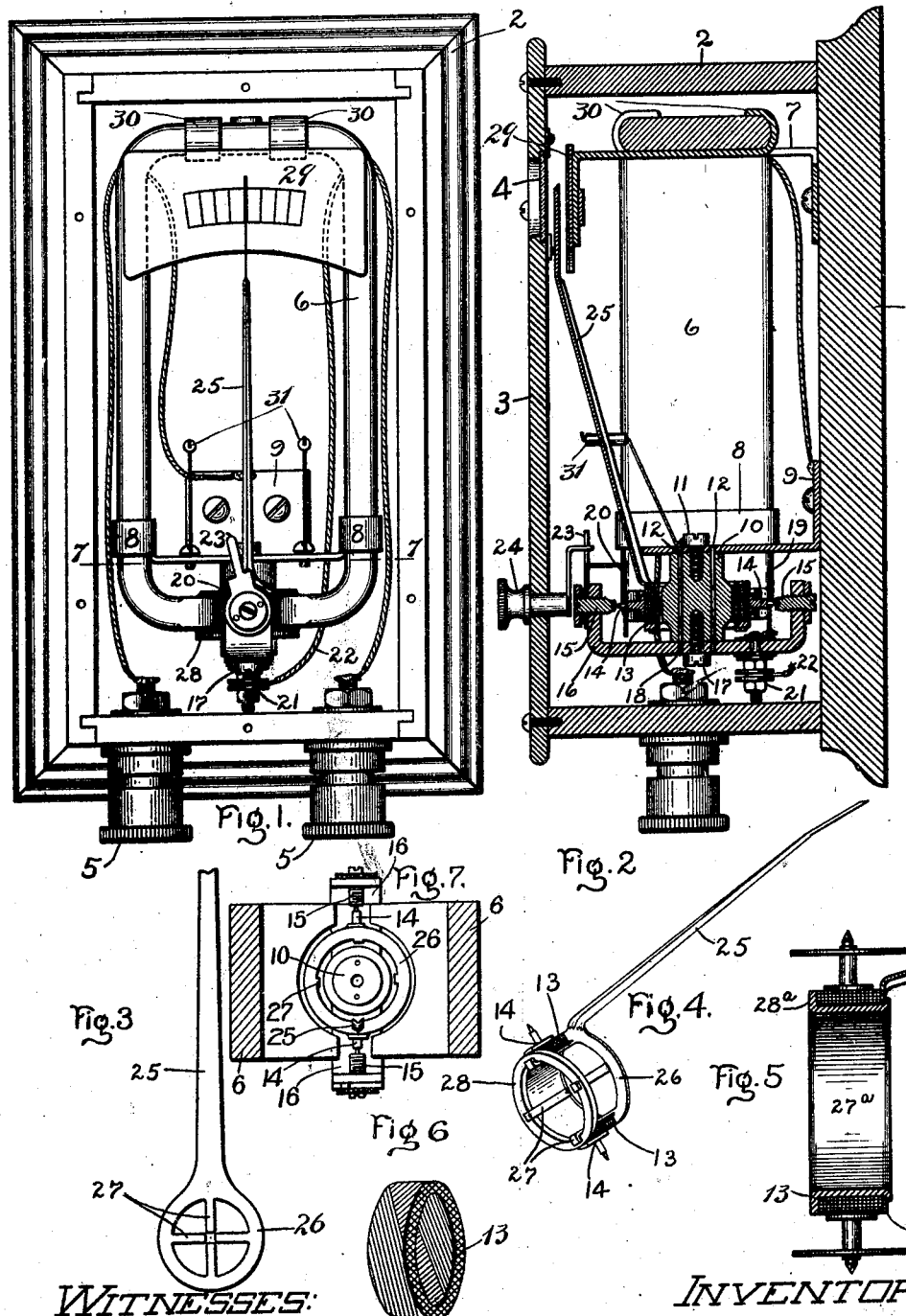

ALVARADO LE ROY ELLIS, OF LYNN, MASSACHUSETTS, ASSIGNOR TO GENERAL ELECTRIC COMPANY, A CORPORATION OF NEW YORK.

ELECTRICAL MEASURING INSTRUMENT.

1,023,304.      Specification of Letters Patent.      Patented Apr. 16, 1912.

Application filed July 29, 1907. Serial No. 385,974.

*To all whom it may concern:*

Be it known that I, ALVARADO L. R. ELLIS, a citizen of the United States, residing at Lynn, county of Essex, State of Massachusetts, have invented certain new and useful Improvements in Electrical Measuring Instruments, of which the following is a specification.

This invention relates to electrical measuring instruments and more particularly to measuring instruments such as galvanometers in which a moving coil for carrying the current to be measured is mounted in the field of a permanent magnet.

Instruments of the above described type are impaired in accuracy by changes in the strength of the field of force produced by the permanent magnet, and any manipulation of the instrument which affects or alters the magnetic circuit may produce a permanent change in the field of force. The moving coil is usually mounted to swing in an annular air-gap between a fixed core generally of a circular cross-section, and pole-pieces having faces concentric with the core. In these instruments as heretofore constructed, the moving coil is so mounted in relation to the core that the core as well as the coil must be removed from the instrument if any changes or adjustments are to be made on the moving system, and unless the core is replaced very exactly in its original position between the pole-pieces of the permanent magnet the magnetic circuit may be permanently altered.

The moving system should be made as light as possible and should also have some device to exert a damping effect. In many instruments heretofore constructed, the coil is supported upon some sort of a core or frame, the damping disk or similar arrangement is secured to the frame, and the pointer for indicating the movement of the coil is secured to one of the pivots of the coil, either by tightly engaging the pivot or by being threaded on the pivot and held in position by a lock-nut. These constructions are expensive and make the weight of the moving system considerably more than that of the coil.

The object of my invention is to provide an electrical measuring instrument of the permanent magnet type, in which the moving system may be removed without altering or affecting the magnetic circuit of the permanent magnet; to provide an improved means of attaching the pointer to the moving coil which will decrease the cost of construction and render the moving system lighter, and to improve the construction of measuring instruments of this type in various ways hereinafter described.

In carrying out my invention I mount a core, preferably circular in cross-section, between the pole-pieces of the permanent magnet, thereby forming an air-gap for the moving coil in which the field of force is very dense and uniform. The core is permanently held in fixed relation to the pole-pieces of the magnet and the moving system is so supported that it may be removed from the air-gap between the core and the pole-pieces of the magnet without disturbing the relation of the core to the magnet, and without affecting in any way the magnetic circuit. The moving system is made exceedingly light by using a universally wound self-supporting moving coil, to which the pointer is directly attached in any suitable manner, preferably by a clamping means which also acts as a damping disk. By this construction all superfluous weight is eliminated, the cost of attaching the pointer to a pivot of the coil is avoided, and the pointer does not exert a twisting strain upon the pivots and their attachments to the coil. The pointer may be directly attached to the damping device, and is preferably stamped out of aluminum with an integral part thereof forming a ring which engages the coil and forms part of the clamping means for attaching the pointer to the coil. The ring may have fingers bent at an angle to the plane of the ring to extend through the coil and position the ring and pointer with relation to the coil.

My invention will best be understood in connection with the accompanying drawings which are an illustration of one embodiment of my invention and in which—

Figure 1 is a top plan view of an instrument embodying my invention; Fig. 2 a sectional view of the instrument shown in Fig. 1; Fig. 3 a plan view of the aluminum stamping from which the pointer and the means for attaching it to the coil are formed; Fig. 4 a perspective view of the pointer and clamping means for holding it to the moving coil, part of the coil being removed; Fig. 5 a similar view showing a construction for securing a strong damping effect; Fig. 6 is a view in perspective of the self-supporting moving coil without a pointer or pivots and Fig. 7 is a partial section of the instrument taken on line 7—7 of Fig. 1.

I have shown my invention applied to a portable galvanometer mounted in a casing consisting of a base 1, sides 2, and a top 3 containing a window 4 through which the scale of the instrument may be observed. The casing is provided with binding posts 5 through which the current to be measured is led to the instrument.

The magnetic system of the instrument shown in the drawing comprises a permanent magnet 6 of the horse-shoe type rigidly held in proper relation to the base 1 by means of a support 7 and clamps 8 forming part of another support 9 firmly secured to the base 1. The supports 7 and 9 rigidly hold the magnet in proper position and are preferably made of brass or other non-magnetic material. The pole-pieces of the magnet 6 which may be modified as desired, preferably have semi-circular pole faces and a core 10 of soft iron, preferably circular in cross-section, is permanently and rigidly mounted between the pole-pieces of the magnet 6, being firmly held in position on the support 9 by means of a set-screw 11 and guiding pins 12 rigidly secured to the support and extending into guide openings in the core 10. The relation of the core 10 to the pole-pieces of the magnet 6 is fixed when the instrument is assembled and is never afterward changed, so that the magnetic circuit remains the same as when the instrument was assembled.

The moving system of the instrument comprises a coil 13 which is self-supporting and very compact on account of being universally wound according to the disclosure of U. S. Patent 486,745, granted November 22, 1892, to Simon Wardwell, Jr. The coil is wound in accordance with the disclosure of said patent to bring the wires in successive layers, and the wire in each turn of each layer extends to the end of the coil and is then reversed at a point beyond the point at which the wire of the preceding turn is reversed, thereby bringing the points at which the wires are reversed in substantially the same plane and laying the wire of each turn parallel to that of the preceding turn. The moving coil wound in the manner above described normally loosely encircles the core and swings in the annular air-gap between the cylindrical core and pole-piece of the magnet, moving at an angle to the axis of the core and tending when current flows to set itself parallel to the axis of the core. The coil has pivots 14 consisting of a hardened steel point in the end of a short stem of aluminum attached to the coil in any suitable manner. The pivots work in jewels 15 carried in a bracket or support 16 so mounted with relation to the magnetic system that the moving coil may be shifted longitudinally of the core and out of the annular air-gap without in any way affecting or altering the relation of the core 10 to the magnet 6. The bracket 16 is preferably secured to the core 10 by means of a set-screw 17 and guiding means comprising pins 18 engaging guide openings in the core. The movement of the coil when current flows through it is resisted by spiral springs 19 and 20, each of which has one end attached to a pivot 14, the two pivots being in electrical connection with the two ends of the coil. The other end of the lower spring 19 is attached to a binding-post 21 carried by and insulated from the bracket 16 and connected through a wire 22 to one of the binding-posts 5, so that current can flow from one binding-post 5, through the wire 22, the binding post 21, and the spring 19, to the coil 13. The other end of the upper spiral spring 20 is in metallic connection with the bracket 16 through an adjusting arm 23 which swings about the support for the upper jewel 15 as a center and is shifted for the purpose of varying the normal position of the moving system by means of an adjusting knob 24 extending through the top 3 of the casing for the instrument. The bracket 16 is in electrical connection with the other binding post through the core 10, the support 9 and a wire leading to said binding post, completing the circuit through the coil.

In order to improve the construction of the moving system and render it as light as possible the pointer 25 for indicating the displacement of the moving coil is attached directly to the coil 13. This construction avoids the expense and other objections of directly attaching the pointer in various ways to one of the pivots which carries the moving coil. The pointer 25 may be attached to the coil in any suitable manner, preferably by a clamping device which also acts as a damping disk. In the preferred construction an aluminum stamping or punching is made in the form shown in Fig. 3, comprising the pointer 25 with a ring 26 integral therewith, and fingers 27 extending radially inward from the inner edge of the ring. The pointer and fingers are then bent so that the pointer extends in one direction from the ring 26 while the fingers extend in the other direction at right angles from the plane of the ring, as shown in Fig. 4. The fingers 27 form part of the surface of a cylinder of substantially the same diameter as the inner diameter of the coil 13, conforming to the shape thereof. The coil is slipped over these fingers until one side thereof comes into engagement with the ring 26. Another ring 28, preferably considerably thicker than the ring 26, is then slipped over the ends of the fingers 27 until it comes into engagement with the other side of the coil 13, after which the ends of the fingers 27 are bent outwardly, as shown in Fig. 4, whereby the various elements of the moving system are firmly clamped to the moving coil 13. The aluminum structure comprising the fingers 27 and the clamping rings 26 and 28 acts as a damping disk, and the weight of the ring 28 partially counterbalances the weight of the pointer 25.

If the instrument has high torque it may be desirable to exert a greater damping effect than can be secured with the above described construction, and an increased damping may be obtained by the construction shown in Fig. 5, in which the pointer is held in engagement with the coil by a structure consisting of metallic tubing 27ª having a flange 27ᵇ at one end in engagement with the ring 26 and a flange 28ª at the other end in engagement with the coil. The tubing and flanges damp the movement of the coil very quickly and effectively and form clamping means for securing the pointer to the coil.

A scale 29 for measuring the extent of movement of the pointer 25 is secured to the magnet 6 by means of clamps 30, while extreme movements of the pointer are prevented by stops 31, preferably consisting of spring wire secured to the support 9 and carrying a cushion of rubber or similar material in a position to be engaged by the pointer 25 at the extreme points of its movement.

My invention may be embodied in many other forms than that shown and described, and I therefore do not wish to be restricted to the precise form shown but intend to cover by the appended claims all changes and modifications within the spirit and scope of my invention.

What I claim as new and desire to secure by Letters Patent of the United States, is,—

1. In a measuring instrument, the combination with a magnetic system comprising concave pole pieces, a cylindrical core mounted concentric therewith to form an annular air-gap, and a fixed support connected to one end of said core to hold it in position, of a circular coil arranged in a plane at an angle to that axis of the core passing through said support, said coil being pivoted to encircle said core and swing in said air-gap.

2. In a measuring instrument, the combination with a magnetic system comprising a magnet with confronting pole surfaces of which the elements are parallel to a straight line, and a core mounted between said pole pieces with its axis substantially parallel to said line, of a pivoted coil mounted to encircle said core and to swing about an axis intersecting the axis of said core, and a supporting bracket for said coil movable parallel to the elements of said pole surfaces and at right angles to the second named axis to withdraw said coil from between the pole pieces.

3. In a measuring instrument, the combination with a magnetic system comprising a magnet with confronting pole surfaces of which the elements are parallel to a straight line and a core mounted between said pole pieces, of a pivoted coil mounted to encircle said core and to swing about an axis intersecting said core, and a supporting bracket for said coil detachably secured to the core and movable at right angles to said axis to withdraw said coil from between said pole pieces.

4. In a measuring instrument, the combination with a magnetic system comprising a magnet with confronting pole surfaces of which the elements are parallel to a straight line and a core mounted between said pole pieces, of a pivoted coil mounted to encircle said core and to swing about an axis intersecting said core, and means for causing said bracket to move parallel to the elements of said pole surfaces and at right angles to said axis during relative movement of said bracket and said pole pieces.

5. In a measuring instrument, the combination with a magnetic system comprising a magnet with confronting pole surfaces of which the elements are parallel to a straight line and a core mounted between said pole pieces, of a pivoted coil mounted to encircle said core and to swing about an axis intersecting said core, a supporting bracket for said coil detachably secured to said core, and coöperating guides on said core and said bracket to maintain said bracket in definite relation to said pole surfaces during movement of the bracket.

6. In a measuring instrument, the combination with the moving coil, of a ring for engaging one side of the coil and having fingers passing through the coil, and a second ring for encircling said fingers and engaging the other side of the coil.

7. In a measuring instrument, the combination with the moving coil, of a ring having fingers integral therewith and extending at an angle to the plane of the ring, and a second ring for encircling the fingers and holding the coil in engagement with the first ring, the ends of the fingers being bent outward to hold the second ring in position.

8. In a measuring instrument, the combination with the moving coil, of a ring having a pointer extending from one side thereof and fingers for engaging the coil extending from the other side, and a second ring for engaging said fingers near the end thereof.

9. In a measuring instrument, the combination with the moving coil, of a ring for engaging one side of the coil carrying a pointer and having integral fingers for passing through the coil, and a second ring for encircling the fingers on the other side of the coil.

10. In a measuring instrument, the combination with the moving coil, of a pointer, and damping means coöperating with said pointer to hold it in frictional engagement with the coil.

11. In a measuring instrument, the combination with a moving coil, of a pointer for indicating the movement of said coil, and damping means in operative relation with said pointer and said coil forming a clamp to engage said coil and thereby hold said pointer in position.

12. In a measuring instrument, the combination with a self-supporting moving coil, of a pointer, and a metallic structure extending through the coil and conforming to the shape thereof for clamping the pointer in frictional engagement with the coil.

13. In a measuring instrument, the combination with the moving coil, of a pointer having a ring integral therewith, and clamping means in engagement with said ring and said coil to hold said ring in position on the coil.

14. In a measuring instrument, the combination with a magnetic system comprising a magnet with confronting pole surfaces of which the elements are parallel to a straight line; a core having its axis substantially parallel to said straight line immovably mounted between said pole surfaces and spaced apart therefrom, of a moving coil pivotally mounted to encircle said core and swing between the pole surfaces and the core about an axis intersecting the axis of said core, and a support for the coil movable relatively to the core and parallel to said pole surfaces.

15. In a measuring instrument, the combination with a magnetic system comprising a magnet with concave pole pieces and a cylindrical core immovably mounted concentric with said pole pieces, of a moving coil pivotally mounted to encircle said core, and a coil support movable longitudinally of the core whereby the coil may be removed without affecting the magnetic circuit of the system.

16. In a measuring instrument, the combination with a magnetic system having concave poles and a cylindrical core permanently positioned between said poles to form an annular air-gap, of a moving coil pivoted to swing about an axis intersecting the axis of said core, and a support for said coil removably mounted in position to maintain the coil in said gap.

17. In a measuring instrument, the combination with a magnetic system comprising a fixed cylindrical core, of a moving coil pivoted to encircle said core to swing about an axis intersecting said core, and a coil support detachably secured to and movable longitudinally of the core whereby the moving coil may be removed without altering the magnetic circuit.

In witness whereof, I have hereunto set my hand this twenty-fifth day of July, 1907.

ALVARADO LE ROY ELLIS.

Witnesses:
JOHN A. MCMANUS, Jr.,
CHARLES A. BARNARD.